March 19, 1935.   E. WIEDMANN   1,994,974
DIFFERENTIAL RESISTANCE VALVE
Filed June 21, 1930
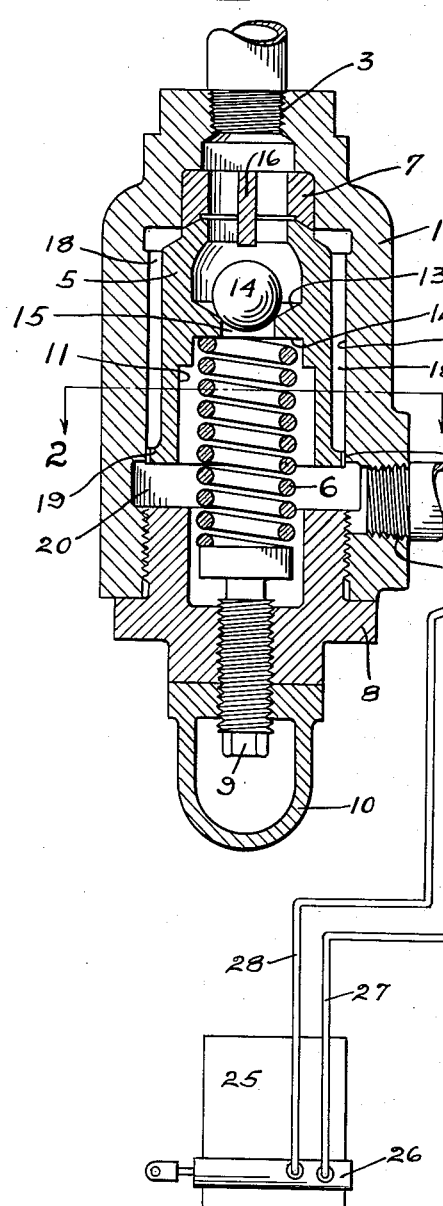
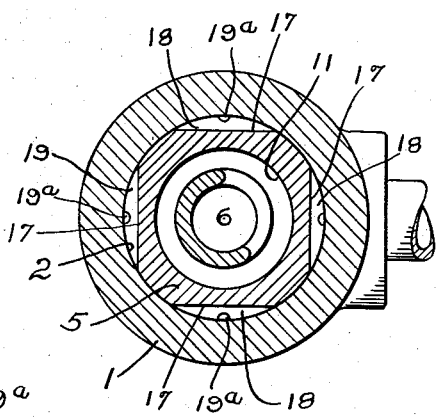
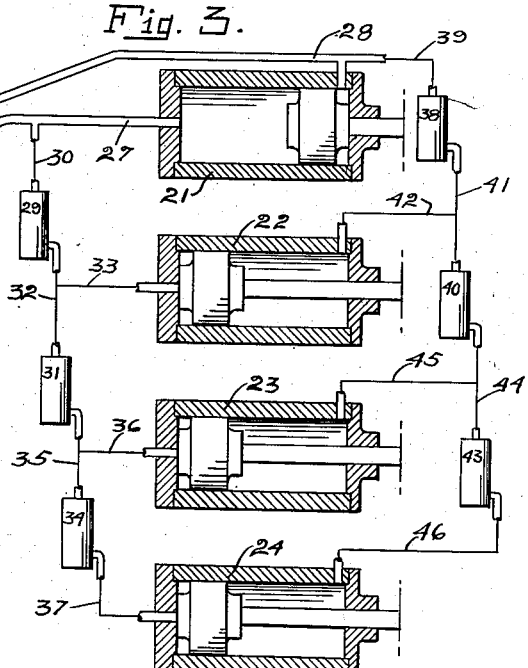
Inventor
ERNST WIEDMANN.
By
Attorney Patented Mar. 19, 1935

1,994,974

UNITED STATES PATENT OFFICE 1,994,974

DIFFERENTIAL RESISTANCE VALVE

Ernst Wiedmann, Milwaukee, Wis., assignor to The Oilgear Company, Milwaukee, Wis., a corporation of Wisconsin Application June 21, 1930, Serial No. 462,787

12 Claims. (Cl. 277—45)

This invention relates to resistance valves for allowing the passage of fluid after the pressure thereof reaches a predetermined maximum.

The valve to which the invention applies in particular has a valve casing provided with an inlet and an outlet, a valve seat surrounding the inlet, and a valve member arranged within the casing and urged against the valve seat by a spring to resist the passage of fluid from the inlet to the outlet.

An object of the invention is to provide a valve of this character which is responsive to the differential between the pressures at its inlet and its outlet whereby the same valve will operate at different pressures.

Another object is to compensate for any leakage which may occur between the valve member and its seat.

Another object is to provide a resistance valve which is compact and efficient.

According to the invention in its general aspect and as ordinarily applied and embodied in practice, means are provided for allowing the escape of any fluid which may seep into the valve casing when the valve is closed whereby the fluid pressure at the inlet acts upon only that area of the valve member which is exposed to the inlet. The fluid initially acts upon this limited area of the valve member and, when the pressure of the fluid reaches a predetermined maximum, the force exerted thereby opens the valve and then the fluid acts upon a greater area of the valve member to hold the valve open until the fluid pressure drops to a predetermined minimum.

According to the invention in another aspect, the valve member is provided with a passageway which is controlled by a check valve and allows fluid to flow freely from the outlet of the casing to the inlet thereof but prevents it from flowing in the opposite direction.

A resistance valve embodying the invention is illustrated in the accompanying drawing in which the views are as follows:

Fig. 1 is a longitudinal section through the valve.

Fig. 2 is a transverse section taken on a line 2—2 of Fig. 1.

Fig. 3 is a circuit diagram illustrating a practical application of the invention.

The resistance valve has a casing 1 which is provided with a longitudinal bore 2, an inlet 3 through which fluid may pass into the bore 2 when the valve is open, and an outlet 4 through which fluid is discharged from the bore 2.

Communication between the bore 2 and the inlet 3 is normally interrupted by a valve member 5 which is slidably fitted in the bore 2 and urged by a spring 6 against an annular valve seat 7 to make a tight joint therewith.

The lower end of the bore 2 is closed by a plug 8 through which an adjusting screw 9 is threaded to support the spring 6, and the outer end of the adjusting screw is enclosed by a hollow cap 10 arranged upon the outer end of the plug 8.

The valve member 5 has a longitudinal bore 11 into which the spring 6 extends and abuts the under side of an annular shoulder 12 to urge the valve member 5 against the valve seat 7.

The upper side of the annular shoulder 12 forms a valve seat 13 which is normally engaged by a ball valve 14 to close the passageway 15 through the shoulder 12.

The movement of the ball valve 14 is limited by a stop 16 carried by the valve seat 7 which preferably is separate from the casing 1 and snugly fitted in the upper end thereof.

The valve member 5 has several flat faces 17, shown as four in number, to provide passageways 18 through which liquid may flow when the valve is open.

The faces 17 stop short of the lower end of the valve member 5 to provide flanges 19 which normally close the lower ends of the passageways 18 from an annular port 20 which is formed in the wall of the bore 2 and communicates with the outlet 4. The flanges 19 are provided with small apertures 19a through which fluid may slowly escape to the outlet 4.

The valve member 5 thus has a valve upon each end thereof to close off the passageways 18, and the arcuate part of its sides intermediate the flat faces 17 hold it in axial alinement.

When the resistance valve is connected into a fluid circuit, fluid may flow freely from the outlet 4 into the bore 11, lift the ball valve 14, and pass outward through the inlet 3.

When fluid attempts to flow through the resistance valve in the opposite direction, it is blocked by the ball valve 14 and the pressure of the fluid is exerted upon an effective area which is shown as being substantially equal to the cross-sectional area of the inlet 3.

The adjusting screw 9 is adjusted to regulate the pressure at which the valve will open and, when this pressure is reached, the force exerted by the fluid upon the valve member 5 compresses the spring 6 and separates the valve member 5 from the valve seat 7, thus allowing fluid to enter the passageways 18 and exert pressure upon the total effective area of the valve member 5.

which is substantially equal to the cross-sectional area of the bore 2.

As the total effective area of the valve member 5 is greatly in excess of the effective area within the bore 11, the force exerted by the fluid is sufficient to move the valve member 5 downward against the action of the spring 6 until the flanges 19 are below the upper edge of the port 20.

Fluid will then flow freely from the inlet 3, through the passageways 18 and the port 20 to the outlet 4 and will continue to flow until the pressure of the fluid drops sufficiently to enable the spring 6 to overcome the force of the fluid upon the total effective area of the valve member 5.

The resistance valve thus opens at a high pressure, which is determined by the tension of the spring 6 and the adjustment of the screw 9, and closes at a pressure which is lower than the high pressure in proportion to the relative areas of the surfaces upon which the fluid acts both before and after the valve opens.

When the resistance valve is employed in a closed circuit, the lower end of the valve member 5 is subjected to the back pressure which prevails at the outlet 4, and this back pressure assists the spring 6 in urging the valve member 5 against its seat. Consequently, a relatively light spring may be employed and the valve may be accurately adjusted.

After the valve closes, the pressure of fluid trapped in the passageways 18 is equalized through the apertures 19a with the pressure of the fluid at the outlet 4. The apertures 19a also allow the escape of any small leakage which may seep between the valve member 5 and the valve seat 7 and thus prevent pressure from building up within the passageways 18.

The valve is ordinarily employed in hydraulic circuits in which two or more hydraulic motors are to be operated successively, such as the circuit shown diagrammatically in Fig. 3.

In this figure, four motors 21, 22, 23 and 24 are operated by liquid delivered from a single pump 25 through a reversing valve 26 which is connected to opposite ends of the motor 21 by pipes 27 and 28.

A differential resistance valve 29 has its inlet connected to the pipe 27 by a pipe 30 and its outlet connected to the inlet of another differential resistance valve 31 by a pipe 32 which is connected to the rear end of the motor 22 by a pipe 33.

The outlet of the valve 31 is connected to the inlet of another differential resistance valve 34 by a pipe 35 which is connected to the rear end of the motor 23 by a pipe 36, and the outlet of the valve 34 is connected to the rear end of the motor 24 by a pipe 37.

A differential resistance valve 38 has its inlet connected to the pipe 28 by a pipe 39 and its outlet connected to the inlet of another differential resistance valve 40 by a pipe 41 which is connected to the forward end of the motor 22 by a pipe 42.

The outlet of the valve 40 is connected to the inlet of another differential resistance valve 43 by a pipe 44 which is connected to the forward end of the motor 23 by a pipe 45, and the outlet of the valve 43 is connected to the forward end of the motor 24 by a pipe 46.

The resistance valves are set to open at a pressure higher than the maximum pressure required to operate the motors and the pump is capable of delivering liquid at a pressure considerably higher than that required to open the resistance valves.

Liquid first flows through the pipe 27 and moves the piston of the motor 21 to the limit of its forward stroke and the liquid in the forward end of the motor cylinder is returned to the pump 25 through the pipe 28 and the reversing valve 26. When the motor piston stalls, the pressure in the pipes 27 and 30 rises until sufficient force is exerted upon the valve member 5 of the resistance valve 29 to move it away from its seat to allow liquid to flow through the valve 29 and the pipes 32 and 33 to the motor 22 and move its piston forward to the limit of its stroke. The liquid expelled from the forward end of the motor cylinder flows through the pipes 42 and 41, raises the ball valve 14 in the resistance valve 38, and flows freely through the valve 38, the pipes 39 and 28 and the reversing valve 26 to the pump 25.

When the piston of the motor 22 stalls at the limit of its forward stroke, the pressure in the pipe 32 rises and forces the valve member 5 of the resistance valve 31 from its seat to allow liquid to flow through the valve 31 and the pipes 35 and 36 to the motor 23 to move its piston forward, and the liquid expelled from the forward end of the motor cylinder is returned to the pump 25 through the pipes 45 and 44, the resistance valve 40, the pipe 41, the resistance valve 38, the pipes 39 and 28 and the reversing valve 26.

When the piston of the motor 23 stalls at the limit of its forward stroke, the resistance valve 34 is opened, the motor 24 is operated in a similar manner, and the liquid in the forward end thereof is returned to the pump 25 through the pipe 46, the resistance valve 43, the pipe 44, the resistance valve 40, the pipe 41, the resistance valve 38, the pipes 39 and 28 and the reversing valve 26.

After the last motor has been operated, the reversing valve 26 is operated to reverse the delivery of the pump 25 and thereby retract the motor pistons in the same order and in the same manner in which they were advanced, each of the resistance valves 38, 40 and 43 opening after the piston of the preceding motor has stalled at the limit of its rearward stroke and the liquid in the rear ends of the motors 22, 23 and 24 being returned through the resistance valves 29, 31 and 34.

As soon as the reversing valve 26 is operated, the pressure in the pipe 27 is relieved and the springs 6 in the resistance valves 29, 31 and 34 urge the valve members 5 against their seats and the returning liquid raises the ball valves 14 and flows freely through the bores 11 of the valve members 5.

Thus, the number of hydraulic motors which may be connected in parallel with a pump and operated successively by means of differential resistance valves connected in series is limited only by the number of resistance valves which may be interposed between the pump and the last motor and still leave sufficient pump pressure available to drive the last motor.

Almost the full pressure of the pump is available for operating each motor successively because each valve remains closed against high pressure until the motor ahead of its has stalled and the valve is forced to open, but thereafter the opened valve offers little resistance to the passage of the working fluid to operate the next motor in the series.

The invention herein set forth is susceptible of various modifications and adaptations without departing from the scope thereof as hereafter claimed.

The invention is hereby claimed as follows:

1. A resistance valve, comprising a casing having a longitudinal bore and an inlet and an outlet, an annular valve seat surrounding said inlet, a valve member arranged in said bore to engage said valve seat and having its outer surface shaped to provide channels between said valve member and said casing, means urging said valve member against said valve seat and resisting the passage of fluid from said inlet to said outlet, flanges carried by said valve member at the inner end thereof to close said channels and having small apertures therein for the escape of a limited volume of fluid from said channels, and a surface having a limited effective area subjected to the pressure of fluid in said inlet whereby a predetermined fluid pressure in said inlet will force said valve member away from its seat against the action of said means and thereby subject the entire cross-sectional area of said valve member to the pressure of said fluid to hold said valve member away from its seat until the pressure of said fluid has dropped to a predetermined minimum.

2. A resistance valve, comprising a casing having a longitudinal bore and an inlet and an outlet, an annular valve seat surrounding said inlet, a valve member arranged in said bore to engage said valve seat and having its outer surface shaped to provide channels between said valve member and said casing, a spring urging said valve member against said valve seat and resisting the passage of fluid from said inlet to said outlet, flanges carried by said valve member at the inner end thereof to close said channels and having small apertures therein for the escape of a limited volume of fluid from said channels, a surface having a limited effective area subjected to the pressure of fluid in said inlet whereby a predetermined fluid pressure in said inlet will force said valve member away from its seat against the action of said spring and thereby subject the entire cross-sectional area of said valve member to the pressure of said fluid to hold said valve member away from its seat until the pressure of said fluid has dropped to a predetermined minimum, and an adjusting screw for adjusting the tension of said spring to thereby vary the force required to move said valve member away from its seat.

3. A resistance valve, comprising a casing having a longitudinal bore and an inlet and an outlet, an annular valve seat surrounding said inlet, a valve member arranged in said bore to engage said valve seat and having its outer surface shaped to provide channels between said valve member and the wall of said bore and also having a longitudinal passageway for the passage of fluid from said outlet to said inlet, flanges carried by said valve member at the inner end thereof to close said channels and having small apertures therein for the escape of a limited volume of fluid from said channels, means urging said valve member against said valve seat and resisting the passage of fluid from said inlet to said outlet, an annular valve seat surrounding said passageway and subjected to the fluid pressure in said inlet, and a valve normally engaging the valve seat around said passageway for preventing the passage of fluid from said inlet to said outlet but allowing passage of fluid in the opposite direction and subjected to the fluid pressure in said inlet, whereby a predetermined fluid pressure acting upon the effective area of the valve and valve seat in said passageway will force said valve member away from its seat and thereby subject the entire cross-sectional area of said valve member to the pressure of said fluid to hold said valve member away from its seat until the pressure of said fluid has dropped to a predetermined minimum.

4. A resistance valve, comprising a casing having a longitudinal bore and an inlet and an outlet, an annular valve seat surrounding said inlet, a valve member arranged in said bore to engage said valve seat and having its outer surface shaped to provide channels between said valve member and the wall of said bore and also having a longitudinal passageway for the passage of fluid from said outlet to said inlet, flanges carried by said valve member at the inner end thereof to close said channels and having small apertures therein for the escape of a limited volume of fluid from said channels, a spring urging said valve member against said valve seat and resisting the passage of fluid from said inlet to said outlet, an annular valve seat surrounding said passageway and subjected to the fluid pressure in said inlet, a valve normally engaging the valve seat around said passageway for preventing the passage of fluid from said inlet to said outlet but allowing passage of fluid in the opposite direction and subjected to the fluid pressure in said inlet, whereby a predetermined fluid pressure acting upon the effective area of the valve and valve seat in said passageway will force said valve member away from its seat and thereby subject the entire cross-sectional area of said valve member to the pressure of said fluid to hold said valve member away from its seat until the pressure of said fluid has dropped to a predetermined minimum, and an adjusting screw for adjusting the tension of said spring to thereby vary the force required to move said valve member away from its set.

5. A differential resistance valve, comprising a casing having an axial bore and an inlet thereto and an outlet therefrom, means for connecting said inlet to one part of a fluid circuit, means for connecting said outlet to another part of a fluid circuit, a valve seat arranged around said inlet and having an opening therethrough considerably less in cross-sectional area than said bore, a plunger arranged within said bore between said inlet and said outlet and having a piston arranged upon its rear end and closely fitted in said bore to substantially close communication between said inlet and said outlet and thereby cause substantially the entire cross-sectional area of said plunger and its pistons to be subjected at all times to the pressure at said outlet, a valve arranged upon the front end of said plunger and normally engaging said seat to close communication between said inlet and said outlet, and a spring urging said plunger forward and assisted by the outlet pressure in retaining said valve in engagement with said seat; said piston having small apertures extending therethrough to prevent the pressure within said bore from being built up above the outlet pressure by liquid seeping between said valve and said seat.

6. A differential resistance valve, comprising a casing having an axial bore and an inlet thereto and an outlet therefrom, means for connecting said inlet to one part of a fluid circuit, means for connecting said outlet to another part of a fluid circuit, an annular valve seat arranged around said inlet and having an opening therethrough considerably less in cross-sectional area than said bore, a plunger arranged within said bore between said inlet and said outlet and having a piston arranged upon its rear end and closely fitted in said bore to substantially close communication between said inlet and said outlet and thereby cause substantially the entire cross-sectional area of said plunger and its pistons to be subjected at all times to the pressure at said outlet, an annular valve arranged upon the front end of said plunger and normally engaging said seat to close communication between said inlet and said outlet, a spring urging said plunger forward and assisted by the outlet pressure in retaining said valve in engagement with said seat, and a check valve arranged within said plunger to prevent fluid from flowing through said plunger from said inlet to said outlet while permitting fluid to flow in the opposite direction; said piston having small apertures extending therethrough to prevent the pressure within said bore from being built up above the outlet pressure by fluid seeping between said valve and said valve seat.

7. A resistance valve, comprising a casing having a bore and an inlet thereto and an outlet therefrom, a valve seat arranged around said inlet and having an opening therethrough considerably smaller than said bore, a valve member of greater cross-sectional area than said opening arranged within said bore and having substantially its entire cross-sectional area subjected at all times to the pressure at said outlet and its front end providing a valve to close said inlet whereby only a relatively small area of said member is exposed to the pressure at said inlet when said valve is closed, said valve having a passage extending therethrough for providing communication between said outlet and said inlet, a check valve arranged in said passage to prevent liquid from flowing from said inlet to said outlet but permitting liquid to flow in the opposite direction, means urging said valve member toward said inlet and tending to retain said valve in engagement with said seat, and a second valve carried by said valve member and controlling said outlet and thereby causing substantially the entire cross-sectional area of said valve member to be subjected to the pressure of the liquid entering said inlet upon said valve being moved away from said valve seat.

8. A resistance valve, comprising a casing having a bore and an inlet thereto and an outlet therefrom, a valve seat arranged around said inlet and having an opening therethrough considerably smaller than said bore, a valve member of greater cross-sectional area than said opening arranged within said bore and having substantially its entire cross-sectional area subjected at all times to the pressure at said outlet and its front end providing a valve to close said inlet whereby only a relatively small area of said member is exposed to the pressure at said inlet when said valve is closed, said valve having a passage extending therethrough for providing communication between said outlet and said inlet, a check valve arranged in said passage to prevent liquid from flowing from said inlet to said outlet but permitting liquid to flow in the opposite direction, means urging said valve member toward said inlet and tending to retain said valve in engagement with said seat, a second valve carried by said valve member and controlling said outlet and thereby causing substantially the entire cross-sectional area of said valve member to be subjected to the pressure of the liquid entering said inlet upon said valve being moved away from said valve seat, and means for preventing pressure from being created between the valves on said member due to leakage past said valve seat when said inlet valve is in engagement with said valve seat.

9. A resistance valve, comprising a casing having a bore and an inlet thereto and an outlet therefrom, a valve seat arranged around said inlet and having an opening therethrough considerably smaller than said bore, a valve member of greater cross-sectional area than said opening arranged within said bore and having substantially its entire cross-sectional area subjected at all times to the pressure at said outlet and its front end providing a valve to close said inlet whereby only a relatively small area of said member is exposed to the pressure at said inlet when said valve is closed, said valve having a passage extending therethrough for providing communication between said outlet and said inlet, a check valve arranged in said passage to prevent liquid from flowing from said inlet to said outlet but permitting liquid to flow in the opposite direction, a spring urging said valve member toward said inlet and tending to retain said valve in engagement with said seat, a second valve carried by said valve member and controlling said outlet and thereby causing substantially the entire cross-sectional area of said valve member to be subjected to the pressure of the liquid entering said inlet upon said valve being moved away from said valve seat, and means for adjusting the tension of said spring to thereby vary the pressure at which said valve will open.

10. A resistance valve, comprising a casing having a bore and an inlet thereto and an outlet therefrom, a valve seat arranged around said inlet and having an opening therethrough considerably smaller than said bore, a valve member of greater cross-sectional area than said opening arranged within said bore and having substantially its entire cross-sectional area subjected at all times to the pressure at said outlet and its front end providing a valve to close said inlet whereby only a relatively small area of said member is exposed to the pressure at said inlet when said valve is closed, said valve having a passage extending therethrough for providing communication between said outlet and said inlet, a check valve arranged in said passage to prevent liquid from flowing from said inlet to said outlet but permitting liquid to flow in the opposite direction, a spring urging said valve member toward said inlet and tending to retain said valve in engagement with said seat, a second valve carried by said valve member and controlling said outlet and thereby causing substantially the entire cross-sectional area of said valve member to be subjected to the pressure of the liquid entering said inlet upon said valve being moved away from said valve seat, means for adjusting the tension of said spring to thereby vary the pressure at which said valve will open, and means for preventing pressure from being created between the valves on said member due to leakage past said valve seat when said inlet valve is in engagement with said valve seat.

11. A resistance valve comprising a casing having a bore and an inlet thereto and an outlet therefrom, a valve seat arranged around said inlet and having an opening therethrough considerably smaller than said bore, a valve member of greater cross-sectional area than said opening arranged within said bore and having substantially its entire cross-sectional area subjected at all times to the pressure at said outlet and its front end providing a valve to close said inlet whereby only a relatively small area of said member is exposed to the pressure at said inlet when said valve is closed, means urging said valve member toward said inlet and tending to retain said valve in engagement with said seat, and a second valve carried by said valve member for controlling said outlet and so positioned upon said member as to throttle the flow through said outlet after the inlet valve has been retracted a substantial distance from said valve seat and thereby cause substantially the entire cross-sectional area of said valve member to be subjected to the pressure at said inlet upon said valve being moved away from said valve seat.

12. A resistance valve, comprising a casing having a bore and an inlet thereto and an outlet therefrom, a valve seat arranged around said inlet and having an opening therethrough considerably smaller than said bore, a valve member of greater cross-sectional area than said opening arranged within said bore and having substantially its entire cross-sectional area subjected at all times to the pressure at said outlet and its front end providing a valve to close said inlet whereby only a relatively small area of said member is exposed to the pressure at said inlet when said valve is closed, means urging said valve member toward said inlet and tending to retain said valve in engagement with said seat, a second valve carried by said valve member for controlling said outlet and so positioned upon said member as to throttle the flow through said outlet after the inlet valve has been retracted a substantial distance from said valve seat and thereby cause substantially the entire cross-sectional area of said valve member to be subjected to the pressure at said inlet upon said valve being moved away from said valve seat, and means for preventing pressure from being created between the valves on said member due to leakage past said valve seat when said inlet valve is in engagement with said valve seat.

ERNST WIEDMANN.